United States Patent Office

Re. 27,081
Reissued Mar. 2, 1971

27,081

FORMATION OF LOW FRICTION GLASS-LIKE SURFACE ON ALUMINUM SILICON ALLOY FOR ENGINE OPERATION

Gilbert R. Shockley, Richmond, Harold H. Macklin, Jr., Bon Air, and Erik F. Barkman and Harold J. Coates, Henrico County, Va., assignors to Reynolds Metals Company, Richmond, Va.

No Drawing. Original No. 3,333,579, dated Aug. 1, 1967, Ser. No. 378,944, June 29, 1964. Application for reissue July 28, 1969, Ser. No. 860,443

Int. Cl. F02f *5/00;* C23f *1/00*

U.S. Cl. 123—193 10 Claims

Matter enclosed in heavy brackets [ ] appears in the original patent but forms no part of this reissue specification; matter printed in italics indicates the additions made by reissue.

*ABSTRACT OF THE DISCLOSURE*

*Method of treating the surface of a hypereutectic silicon aluminum base alloy article which comprises the steps of preferentially removing aluminum from and polishing surface layer of the article to provide plateaus of silicon which are substantially free of sharp edges where they protrude above the surrounding surface and the resultant high silicon aluminum base alloy article having plateaus of silicon above the surrounding surface thereof which are substantially free of sharp edges.*

This invention relates to a novel method for the production of a low friction surface on the face of high silicon aluminum base alloys. More particularly, the invention concerns a novel method of treating the working surfaces of engine cylinders made of high silicon aluminum alloys to impart to said surfaces increased resistance to scuffing and scoring and corrosion.

In the automotive industry, it is standard practice to prepare internal combustion engines for service by means of a break-in or run-in operation. The run-in is intended to establish proper cylinder and piston ring surface conditions whereby these parts attain compatibility in as short a time as possible under specific load and temperature conditions. The formation of an optimum surface finish, particularly on the cylinders, reduces the run-in time and increases the operating life of the engine parts. It is usually difficult to achieve good piston ring and cylinder surface compatibility under run-in conditions, with the result that scuffing and scoring of the compression ring and cylinder surfaces occurs, shortening engine life, promoting wear corrosion, and loss of compression. Methods to improve cylinder and ring surfaces which have been proposed in the prior art include cross-hatching of cylinder surfaces and filling the grooves with a lubricant such as graphite, or the successive lapping of cylinder walls with coarse and fine lapping compounds. These methods have had limited success in the case of engines employing cast iron cylinders and piston rings.

In the development of automotive engines employing cast aluminum cylinder blocks, or employing aluminum cylinder liners in cast iron cylinder blocks, and aluminum piston and rings, the achievement of cylinder-ring compatibility has proved a much more serious obstacle than in the case of conventional iron engine parts, and prior to the present invention, had remained unsolved. Thus, even where engines utilized aluminum cylinder blocks, as well as an aluminum crankcase and an aluminum cylinder head, it was still necessary to resort to the use of cast iron cylinder sleeves in the block.

Efforts to operate engines with bare aluminum or aluminum alloy pistons or rings on bare aluminum walls resulted in unsatisfactory low temperature compatibility, partly because the aluminum surfaces are not characterized by persistent oil retention, as in the case with iron surfaces. The oil drains off the aluminum surface, resulting in scuffing and scoring, when the parts are brought together in sliding motion through piston ring engagement.

The aluminum casting alloys otherwise are well suited for the production of engine blocks, cylinder heads, and other motor parts. These alloys include alloying elements such as silicon either alone or in combination with, magnesium, or copper, or combinations of these elements. Silicon is essential for many reasons including that it improves a fluidity of the molten aluminum in the casting operation, decreases leaks in the finished casting, and contributes to strength and weldability.

In accordance with the invention, it has been found that high silicon aluminum base alloys can be provided with a low friction surface by a novel process comprising the step of preferentially removing aluminum at the surface of the alloy to expose particles of silicon protruding above the surrounding aluminum alloy surface, thereby enriching the surface in silicon, and [then] mechanically polishing the protruding silicon surfaces [to form a glaze-like surface or finish on the alloy].

The expression high silicon aluminum base alloys as employed herein refers to hypereutectic aluminum base casting alloys containing up to about 20% silicon by weight, as well as to such alloys which further contain from about 3% to about 11% copper, or from about 7% to about 9% magnesium. An alloy which has proved especially useful for engine block and piston manufacture and which is readily adapted to treatment in accordance with the invention is a hypereutectic aluminum base alloy containing about 16–18% silicon, together with about 4.2—4.9% copper and small amounts of magnesium, iron and titanium. The alloy is advantageously subjected to a preparatory treatment in molten condition by the addition of about 0.01% sodium and about 0.75% of a powdery phosphorous admixture identified as Alphosit, by weight, in conventional manner, so as to develop a silicon particle size in the cast condition of typically 10 to 40 microns (compared to about 50–100 microns in the absence of such treatment).

The novel treatment of the invention is believed to transform the sharp protruding edges of the silicon particles or crystals extending above the surface of the alloy into comparatively flat plateaus of silicon which provide a low friction finish of remarkable smoothness and hardness. This finish renders the aluminum alloy thus treated especially suitable for wear surfaces, such as those of cylinders and pistons and piston rings of engines, as well as bearing surfaces of all types.

An enriched silicon surface of the kind provided by the method of the invention would not result from the application of conventional honing, lapping or etching method which attacks and removes the silicon particles in the alloy as well as the aluminum, leaving no basis for the subsequent formation of a silicon glaze.

In accordance with the invention, the preferential removal of aluminum at the surface of the alloy to expose particles of silicon protruding above the surface, thereby enriching the surface in silicon, may be performed either mechanically or chemically.

According to a first aspect of the invention, the preferential removal of aluminum is carried out by first lapping the surface of the alloy to a rough finish, employing for this purpose any suitable rough lapping composition, such as, for example, a mixture of aluminum oxide or silicon carbide and a mineral oil.

The removal of the aluminum is then accomplished, in ccordance with the invention, by employing as a lapping ompound a suspension or dispersion of finely divided lemental silicon in a mineral oil, and honing the alloy urface therewith to produce initially a preferential atack on the aluminum alloy matrix, removing the aluinum, and forming a surface in which the silicon crystals re very little attacked and extend or protrude above the lloy surface. As the honing with the silicon-oil lap omposition is continued, the sharp edges of the proruding alloy silicon are levelled off, and at the same time ome silicon from the lap composition is deposited. This roduces, in effect, a conditioning of the alloy surface o provide a low-friction glaze finish of great resistance o scuffing and scoring, and to wear corrosion.

The lap composition comprises a mixture of elemental ilicon and a mineral oil, forming a paste. The elemental ilicon is preferably of high purity, for example 98% Si. he silicon is in finely divided condition, the average partile size ranging from about 2 to about 200 microns, referably about 150 microns. The mineral oil phase is referably an automotive engine oil, such as, for examle, a 10–W grade engine oil, but any suitable lapping il, or an oil of the type conventionally used as an engine un-in oil may be employed. The silicon and the mineral il are admixed in a proportion ranging from about 40% ilicon and about 60% oil to about 85% silicon and about 5% oil, by weight. The preferred proportion is 70% ilicon to about 30% oil, by weight.

The honing or lapping operation employing the novel apping composition of the invention may be performed vith any conventional type of honing equipment, for xample, a machine employing a vitrified bonded fused lumina honing stone, to which the lapping composition s applied. Where, for example, the object to be honed s a cast aluminum alloy cylinder block, the surfaces of he board or reamed or cast cylinders can be completely moothed and provided with a glaze surface by the use f honing machines of the vertical type wherein the honng tool is rotated and reciprocated while the work is eld stationary, by suitable power actuating means. The oning stones or abrasive elements are expanded radialy outward to exert a substantial pressure on the cylinder urfaces, while at the same time they are rubbed over he surfaces with simultaneous rotational and recipro-atory movements.

In accordance with the second aspect of the invention, he preferential removal of the aluminum from the alloy nd exposure of the silicon is carried out by a chemical reatment. The exposure of the silicon particles may be ccomplished, in accordance with the invention, by disolving away the surrounding aluminum with either an cid or an alkaline treating bath.

The acid treating bath is advantageously an aqueous nineral acid solution of the type employed in etching nd bright dipping of aluminum alloys. For the treatment f high silicon alloys, it is advantageous to use a solution f phosphoric acid and nitric acid, or of nitric acid and ydrofluoric acid. A preferred type of treatment bath is ne having the composition, by volume, from about 60% o about 90% phosphoric acid (85% grade), from about % to about 15% of nitric acid (70% grade), remainder vater up to 15%. A small amount of a wetting agent may e included in the bath. The surface is treated with this olution for a period of from 30 seconds to 3 minutes, t a temperature of the bath between about 180° F. and bout 220° F. A preferred practice of the acid treatment nvolves the use of a bath composed of 80% by volume f 85% grade phosphoric acid, 15% by volume of nitric cid (70%), and 5% water, treatment time being of the rder of 45 seconds.

Alternatively, there may be employed for aluminum emoval an alkaline type treating bath, such as a soluion of sodium hydroxide or sodium carbonate, which ncludes a small amount of sodium gluconate. There may be advantageously employed a solution of sodium hydroxide containing from about 3 to 9 ounces (2% to 6%) of solid sodium hydroxide per gallon of solution, the preferred concentration being about 6 ounces (5%) NaOH. Sodium gluconate is present in about 0.01 lb. per gallon. The treatment temperature range is from about 90° F. to about 160° F., preferably about 130° F., while the time of treatment is from 1 to 10 minutes, preferably about 2.5 minutes.

The silicon particles and crystals thus exposed by chemical treatment of the alloy, and protruding above the alloy surface, are conditioned by the treatment and when subjected to mechanical deformation, as by lapping or polishing, form a dense smooth glaze finish upon the alloy surface. This mechanical treatment may be accomplished by means of the lapping composition of silicon and mineral oil previously described. It may also be accomplished by the application of a metal surface under pressure, as in the case of a cylinder and piston, or of a bearing element.

When applied to aluminum alloy engine cylinders, the glaze finish of the invention results in increased wear compatibility with piston surfaces, as well as increased corrosion wear protection. Moreover, the lubrication is improved by reason of better wettability of the glaze coated cylinder and piston ring surfaces toward the lubricating oil. Another advantage of the invention is the ability to conduct the break-in or run-in procedure with greatly reduced operating time, and at low temperatures, with substantial absence of scuffing and scoring and corrosion effects.

The beneficial effects of the glaze finish of the invention in high silicon aluminum base alloy engine cylinders and other components may be demonstrated by means of an accelerated cold scuff test. In this test, the glaze finished engine is run for 12 minutes at room temperature, and then the water jacket temperature is reduced by circulating refrigerant therethrough at a temperature of 30° F., and the engine is run under these conditions for an additional 2½ hours. When the engine is disassembled for inspection and measurement, it is found that excessive scuffing and scoring are eliminated.

The practice of the invention is illustrated by the following examples, which are not, however, to be considered as limiting.

EXAMPLE 1

A Renault type I water-cooled automotive engine was fitted with aluminum base alloy cast cylinder sleeves, the alloy containing about 17% silicon, and standard pistons equipped with chromium-plated iron rings. The engine characteristics were: 4 cylinder, bore 2.146", stroke 3.15", displacement 45.58 cu. in., compression ratio 7.25 to 1. Cylinders No. 2 and 4 were similarly rough honed, and then lapped with a conventional cast iron lap together with the aforementioned silicon-oil lapping paste.

The engine was assembled and run at ambient temperature for a break-in period of 12 minutes. Then the spark plugs were removed and the inside of the cylinder bore inspected with a horoscope, an instrument permitting illuminated visual inspection. A smooth surface appeared upon this inspection. Then refrigerated water at 30° F. was circulated through the engine cooling jacket and the engine was run for 2½ hours, at the end of which time it was disassembled for inspection. Visual inspection of the cylinder bores revealed no scuffing or scoring; wear on the cylinder surfaces and ring surfaces appeared equal. Despite the short time of operation, a hard glaze was found on the surfaces of the cylinders.

EXAMPLE 2

Using the same type of engine as in Example 1, the cylinder sleeves having a wall thickness of approximately ¼" after rough honing with a No. 320 honing stone, were treated with an acid bath composed of 80% phosphoric acid (85% strength), 15% nitric acid (70% grade), and 5% water, all by volume. The treatment affected the cylinder bores to a depth of between about 0.0005" and 0.001", and exposed silicon particles and crystals. The engine was assembled and subjected to a 12 minute break-in and 2½ hour run-in test at 30° F., as in Example 1. Upon disassembling, the cylinder bores and ring surfaces were free from scuffing and scoring, and the cylinder bores were found to exhibit a smooth glaze-like finish.

While presently preferred embodiments of the invention and its practice have been described, it will be apparent that the invention may be otherwise variously embodied and practiced within the scope of the following claims.

What is claimed is:

[1. Method of forming a low friction finish on the surface of a hypereutectic silicon aluminum base alloy article, which comprises the steps of preferentially removing aluminum from a surface layer of said article to expose particles of silicon protruding above the surrounding alloy surface, and then mechanically polishing the protruding silicon surfaces to produce a glaze-like finish on the surface of said article.]

2. Method of conditioning the surface of a hypereutectic silicon aluminum base alloy engine cylinder to form thereon a low friction finish, which comprises the steps of preferentially removing aluminum from the interior of said cylinder to expose particles of silicon protruding above the interior surface, and then mechanically polishing the protruding silicon surfaces to produce a glaze-like finish on the surface of said cylinder interior.

3. The method of claim 2 in which the aluminum is removed by lapping the cylinder interior with a suspension of finely divided silicon in a mineral oil.

4. The method of claim 2 in which the aluminum is removed by etching with an acid bath.

5. The method of claim 2 in which the aluminum is removed by etching with an alkaline bath.

6. The method of claim 2 in which the aluminum base alloy consists essentially of silicon about 16–18%, copper about 4.2–4.9%, iron up to about 1.0%, magnesium about 0.45–0.65%, titanium about 0.08–0.2%, manganese about 0.1% max., balance substantially aluminum.

7. The method of claim 3 in which the mechanical polishing step is performed by further lapping with a silicon-mineral oil suspension.

8. The method of claim 3 in which the mechanical polishing step is performed by the reciprocating action of a piston ring in engine operation.

[9. A high silicon aluminum base alloy article having on a surface thereof a low friction finish produced by the method of claim 1.]

10. A high silicon aluminum base alloy engine cylinder having on the piston ring engaging surface thereof a low friction finish produced by the method of claim 2.

*11. Method of conditioning the surface of a hypereutectic silicon aluminum base alloy engine cylinder which comprises preferentially removing aluminum from and polishing the interior surface of said cylinder to provide plateaus of silicon which are substantially free of sharp edges where they protrude above the surrounding surface, thereby affording resistance to scuffing and scoring particularly during break-in or run-in operations at low temperature.*

*12. A high silicon aluminum base alloy engine cylinder having substantially flat plateaus of silicon above the surrounding piston ring engaging surface thereof produced by the method of claim 11.*

References Cited

The following references, cited by the Examiner, are of record in the patented file of this patent or the original patent.

UNITED STATES PATENTS

| | | | |
|---|---|---|---|
| 1,838,633 | 12/1931 | Pacz | 148—6.2 |
| 2,978,360 | 4/1961 | Bradstreet et al. | 117—105.2 |
| 3,161,181 | 2/1964 | Wiese | 123—1 |

JACOB H. STEINBERG, Primary Examiner

U.S. Cl. X.R.

29—149.5; 51—290; 75—148; 156—2, 6, 7, 22; 308—241, 237